(12) United States Patent
Etgar

(10) Patent No.: US 8,079,203 B2
(45) Date of Patent: Dec. 20, 2011

(54) HARVESTER

(76) Inventor: Elad Etgar, Bet-Lehem Haglilit (IL)

( * ) Notice: Subject to any disclaimer, the term of this patent is extended or adjusted under 35 U.S.C. 154(b) by 0 days.

(21) Appl. No.: 12/779,621

(22) Filed: May 13, 2010

(65) Prior Publication Data

US 2010/0300058 A1 Dec. 2, 2010

(30) Foreign Application Priority Data

May 13, 2009 (IL) .......................... 198728

(51) Int. Cl.
*A01D 41/14* (2006.01)
*A01D 67/00* (2006.01)

(52) U.S. Cl. .................................. 56/10.2 R

(58) Field of Classification Search ... 56/10.2 A–10.2 H, 56/10.2 R, 51, 53, 60, 119, 327.1, 1, 6, 14.1, 56/16.4 B, 16.4 C, 192, 16.5; 100/169, 170; 209/659, 660, 667, 670, 673; 460/1, 7, 25
See application file for complete search history.

(56) References Cited

U.S. PATENT DOCUMENTS

| | | | |
|---|---|---|---|
| 5,359,836 A | 11/1994 | Zeuner et al. | |
| 5,437,145 A | 8/1995 | Farley et al. | |
| 5,535,578 A | 7/1996 | Honey | |
| 6,360,515 B1 * | 3/2002 | Cook | 56/14.1 |
| 6,419,093 B2 * | 7/2002 | Boese | 209/670 |
| 6,584,755 B2 * | 7/2003 | Holtkotte | 56/10.2 B |
| 7,303,058 B2 | 12/2007 | Debruyeker | |
| 7,404,283 B2 | 7/2008 | Viaud | |
| 2006/0196161 A1 | 9/2006 | Krone et al. | |

FOREIGN PATENT DOCUMENTS

EP 640 277 A1 8/1994

* cited by examiner

*Primary Examiner* — Robert Pezzuto
(74) *Attorney, Agent, or Firm* — Pearl Cohen Zedek Latzer, LLP

(57) ABSTRACT

The present invention relates to the mechanical harvesting of ground crops. More particularly, the invention provides an adjustment mechanism for altering the distance setting between centers of at least one pair of driven revolving pairs (such as helixes) on site as needed to suit changing conditions encountered during harvesting. The present invention achieves the above objects by providing an improved harvester attachment for row-planted ground crops, particularly vegetables, or the like the harvester comprising a framework supporting at least one revolvably driven helix, or the like, pairs, each helix having a front support bearing disposed slightly above ground level, the helix pairs extending at a slope upwards and rearwards, i.e. in a direction opposite to the direction of travel of said harvester.

7 Claims, 6 Drawing Sheets

HARVESTER

CROSS REFERENCE TO RELATED APPLICATIONS

This Application claims the benefit of Israel Application No. 198728, filed May 13, 2009, which is hereby incorporated by reference in its entirety.

BACKGROUND AND FIELD OF THE INVENTION

The present invention relates to the mechanical harvesting of ground crops. More particularly, the invention provides an adjustment mechanism for altering the distance setting between centers of at least one pair of driven revolving pairs (such as helixes) on site as needed to suit changing conditions encountered during harvesting.

Harvesting machines for ground row crops have been developed to meet the needs of farmers who no longer have available a dependable supply of low-wage seasonal workers. The required qualities of a harvesting machine are to gather a high percentage of fruit/vegetables from ground plants, while at the same time minimizing damage to the produce and minimizing damage to and collection of part of the plant. Collecting of 80% of the vegetable (fruit) under cultivation is considered acceptable machine performance. The remaining crop is later collected by hand.

Many machines are provided with a conveyor for receiving cut crops from the revolving pairs and for transferring the crops to an on-board storage bin. A control cab is supported on a framework seating an operator. The cab has transparent panels enabling a human operator to view the harvesting process. This operator may or may not be the vehicle driver. A plurality of wheels support the framework above ground level and allow the harvesting to advance, either under its own power or as drawn by a tractor.

Although agricultural harvesting machines have been in use for several decades, and the general design of such machines has been stabilized, a search of US patents failed to produce any reference relevant to the improvement disclosed in the present invention. The majority of prior art references to harvesters which were reviewed, such as U.S. Pat. Nos. 5,359,836, 5,437,145 5,535,578 7,303,058 and 7,404,283, US Patent Application Publication No. 2006/0196161, and EP 640 277 A1, are concerned with keeping the harvester head at a suitable height and angle relative to the ground being traversed.

As part of an effort to improve harvesting efficiency, in general, and harvesting of paprika in particular, the present inventor has determined by extensive tests that the ability to apply pressure on the plant by adjusting the spacing between centers of the rotating means specifically of a helix pair during the harvesting operation would make possible a significant increase of the percentage of crop gathered by the machine in a single pass. This innovation was not found in prior art devices, and is not taught or suggested in any of the above-listed documents. Such adjustment would apparently lead to serious mechanical complication of the helix bearings and drive mechanism. In addition to these considerations, existing designs failed to provide sufficient flexibility of the helix bearing support, although this is needed in order to reduce the percentage of damaged crop.

In all known machines, the adjustment, if possible, is done manually prior to the harvesting and cannot be done during the harvesting operation.

OBJECTS OF THE INVENTION

It is, therefore, one of the objects of the present invention to obviate the disadvantages of prior art ground crop harvesting vehicles and to increase the percentage of gathered crop by providing an improvement which allows adjustment of helix spacing without stopping the machine being in operation in the field.

It is a further object of the present invention to reduce crop damage during machine harvesting by providing flexibility of the helix support.

SUMMARY OF THE INVENTION

The present invention achieves the above objects by providing an improved harvester attachment for row-planted ground crops, particularly vegetables, or the like, said harvester comprising a framework supporting at least one revolvably driven helix, or the like, pairs, each helix having a front support bearing disposed slightly above ground level, said helix pairs extending at a slope upwards and rearwards, i.e., in a direction opposite to the direction of travel of said harvester.

The improvement is that there is further provided a mechanism supported by said framework and arranged to adjust the force and distance between the axes of said front support bearings of said at least one helix pair, said adjustment being effected through a control element operated as required by a human attendant.

BRIEF DESCRIPTION OF THE DRAWINGS

The invention will now be described further with reference to the accompanying drawings, which represent by example preferred embodiments of the invention. Structural details are shown only as far as necessary for a fundamental understanding thereof. The described examples, together with the drawings, will make apparent to those skilled in the art how further forms of the invention may be realized.

PREFERRED EMBODIMENTS OF THE INVENTION

In a preferred embodiment of the present invention there is provided an improved harvester attachment wherein said mechanism is arranged to adjust the distance between the axes of said front support bearings by up to about 10-30 mm.

In a most preferred embodiment of the present invention there is provided an improved harvester attachment wherein said mechanism is powered pneumatically.

In a further preferred embodiment of the present invention there is provided an improved harvester attachment wherein said mechanism is powered hydraulically.

In yet a further preferred embodiment of the present invention there is provided an improved harvester attachment wherein said mechanism is powered electrically.

In a preferred embodiment of the present invention there is provided an improved harvester attachment wherein said human attendant rides in a cab carried by the vehicle.

In a further preferred embodiment of the present invention there is provided an improved harvester wherein said human attendant may walk in proximity to the harvester vehicle.

In another preferred embodiment of the present invention there is provided an improved harvester attachment wherein said ground crop is paprika.

It will thus be realized that the novel device of the present invention provides a solution to a common situation where crop size and degree of ripeness encountered during harvesting is irregular due to variations in the ground, irrigation, solar exposure and other factors which can, and do, vary even in a single field.

In areas where the crop is not yet fully developed, the vegetable will be smaller and harder, and attached more strongly to the plant, wherefore the distance between helix, or the like, centers can be decreased. In other areas of the same field, the crop may be fully ripe, larger and softer, these considerations calling for increased spacing of the helix centers.

Whether the worker controlling the helix center distance is driving the harvester, or is viewing harvesting progress from a cab carried by the vehicle, or whether this worker is walking by the side of the vehicle, he/she carries a lightweight control device operatively connected, either by a physical link such as a small-diameter pneumatic tube, or by a low-voltage cable or by a remote wireless-operated control.

The advantage of pneumatic operation of the adjustment device lies in the fact that the pneumatic cylinder seen in the diagram also serves to act as a mechanical spring, thus providing the flexibility needed in this type of device.

The advantage of the hydraulic control emanates from the ready availability of hydraulic power in many agricultural machines and vehicles. Furthermore, the bearing can be set and held in mid-position.

Electric controls bring advantages such as design flexibility and being applicable for use in combination with many other components, particularly in combination with mechanical springs.

Figure 1:
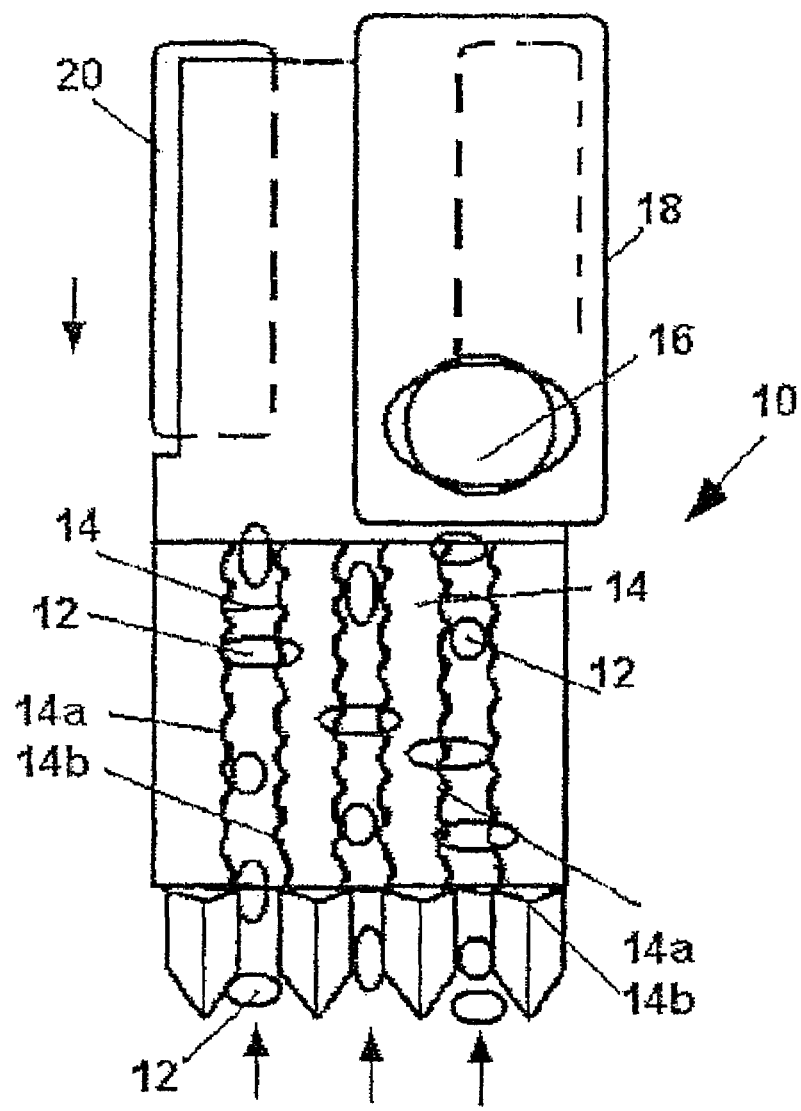
FIG. 1 is a plan view of a prior art harvester wherein the distance between helix bearings is fixed.

There is seen in FIG. 1 a diagrammatic representation of a prior art harvester 10 for gathering row-planted ground crops 12, particularly vegetables.

The harvester 10 comprises a framework supporting a plurality of revolvably driven helix pairs 14. Each individual helix 14a, 14b has a fixed front support bearing (not seen) disposed slightly above ground level. The helix pairs 14 extend at a slope upwards and rearwards, i.e. in a direction opposite to the direction of travel of the harvester 10.

Figure 2:
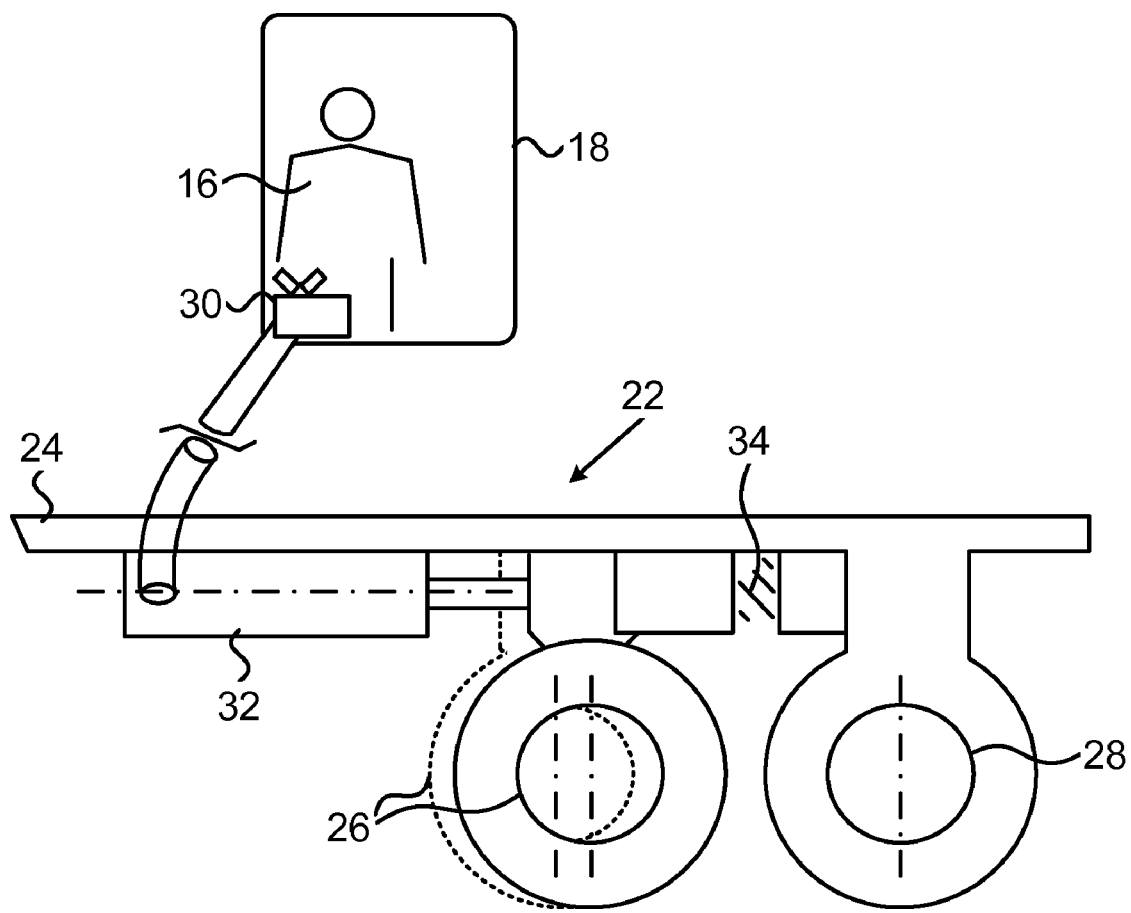
FIG. 2 is a schematic front view of the improvement according to the present invention showing the helix pair lowers bearings wherein the center distance between the helixes is adjustable.

Referring now to FIG. 2, there is seen the proposed improvement, which comprises a bearing support mechanism 22 supported by a framework 24. The mechanism 22 allows movement of a first 26 of the lower bearings in a direction towards or away from the second, fixed bearing member 28 of a helix pair 14 seen in FIG. 1.

Repositioning of the first bearing 26 to change the distance between the axes of the front support bearings 26, 28 of the helix pairs 14 causes a corresponding change in the force needed to increase said distance A control device 30 is situated for convenient access of a human operator 16 riding in the cab 18. The device 30 is in operative communication with an actuator 32 forming part of the adjuster mechanism.

A spring element 34 in combination with the actuator 32 determines the position of the first lower bearing 26.

Due to the length of the helix pairs 14, typically more than 1 meter, and the short adjusting range required, being about 8 mm each side, there is usually no need for any modification of the helix upper bearings (not seen).

With reference to the rest of the figures, similar reference numerals have been used to identify similar parts.

The invention will now be described further with reference to the accompanying drawings, which represent by example preferred embodiments of the invention. Structural details are shown only as far as necessary for a fundamental understanding thereof. The described examples, together with the drawings, will make apparent to those skilled in the art how further forms of the invention may be realized.

Figure 3:
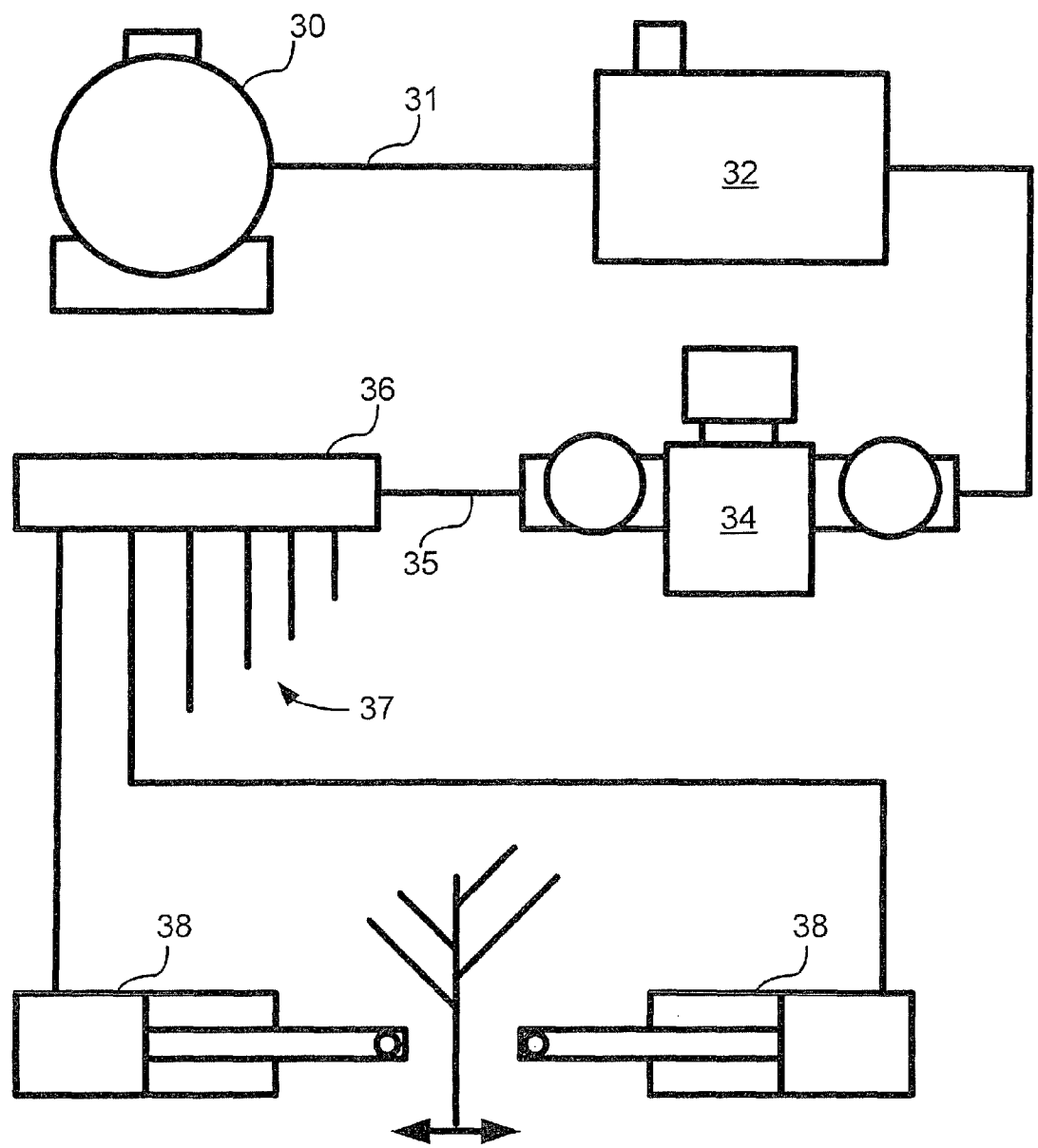
FIG. 3 is a schematical diagram of a pneumatic system adapted to operate the attachment.

FIG. 3 illustrates schematically a pneumatic system adopted to operate the helixes. The system comprises an air compressor 30 connected to a compressed air container 32 via pipe 31. A pressure regulator 34 connected via pipe 35 with air distribution manifold 36. A plurality of conduits 37 are connected to pairs of air pistons 38 which in turn are attached to a pair of helixes (not seen)

Figure 4:
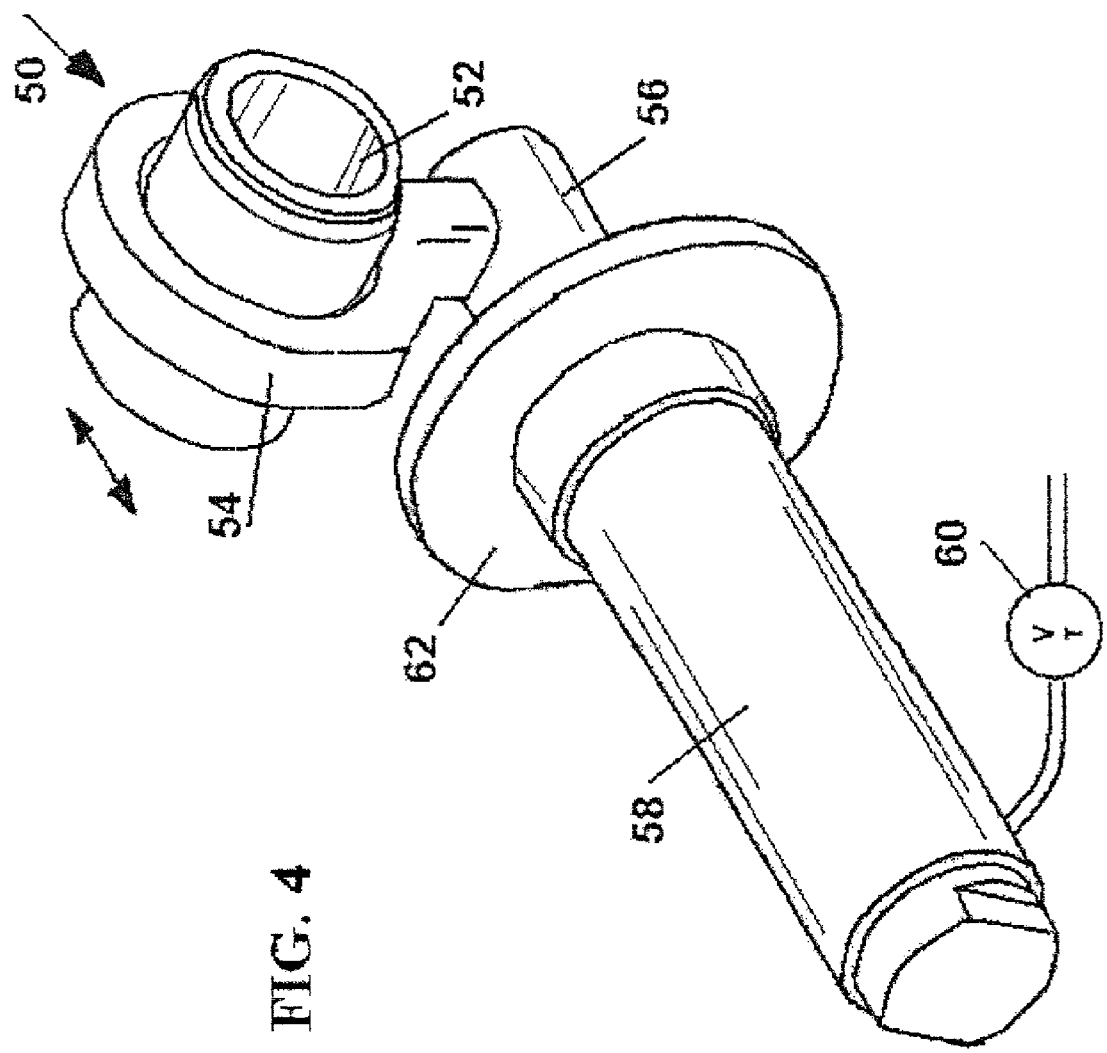
FIG. 4 is a perspective view of an embodiment driven pneumatically.

Seen in FIG. 4 is a further embodiment of a mechanism 50 for the improved harvester. The mechanism 50 is powered pneumatically.

The movable lower bearing 52 is mounted on a support yoke 54 which in turn is mounted on the piston rod 56 of a pneumatic cylinder 58. The cylinder 58 is connectable to a fixed part of the harvester 40 by means of the flange 62.

The air pressure inside the cylinder 58 can be varied by means of control valve 60.

The advantage of pneumatic power is that the position of the bearing is held flexibly due to the elasticity of the compressed air held inside the cylinder 58

Figure 5:
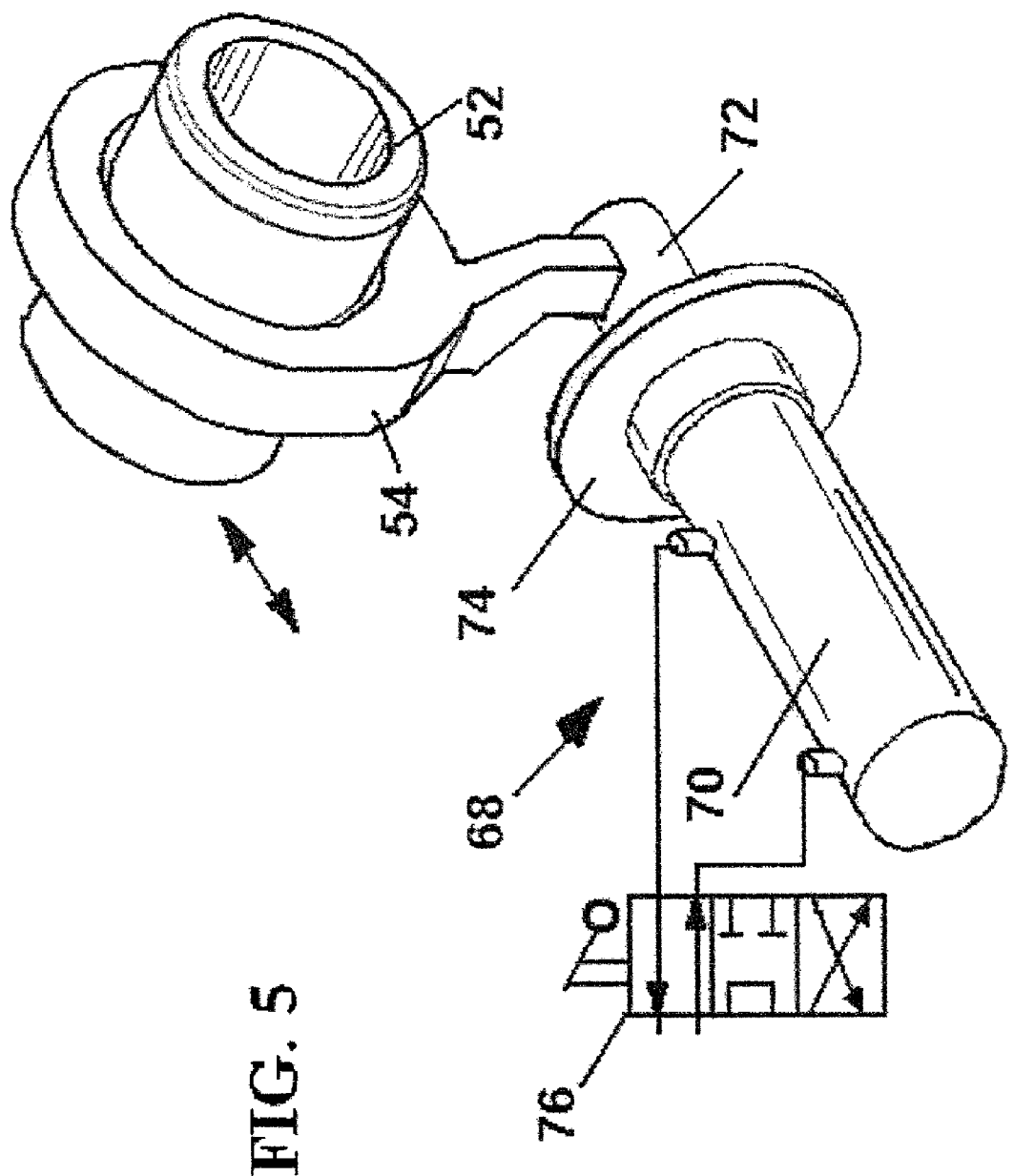
FIG. 5 is a perspective view of an embodiment driven hydraulically.

Referring now to FIG. 5, there is depicted a detail of a further embodiment of the improvement 68 to a harvester. A small hydraulic cylinder 70 has a projecting piston rod 72. The adjuster mechanism is attachable to a fixed element of the harvester by means of the flange 74 and is powered through a 3-position directional control valve 76, whereby the center distance between helix bearings can be set for WIDER, HOLD, and CLOSER. Thus, if desired any intermediate position can be held. A further advantage of hydraulic operation is that hydraulic power is often readily available on agricultural machines. As seen in the figure, the hydraulic cylinder 70 is compact and fits easily into any available space. A single valve 76 can control a plurality of cylinders 70.

Figure 6:
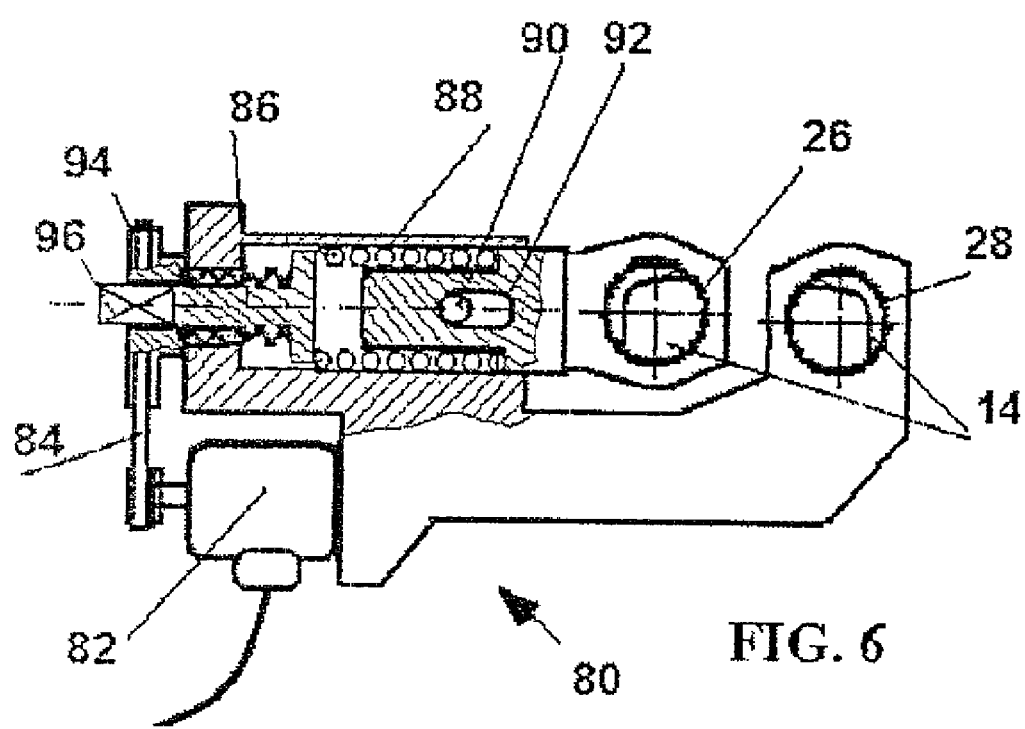
FIG. 6 is a partly sectioned view of an electrically driven embodiment according to the invention

FIG. 6 shows another embodiment 80 of the mechanism used for changing the center distance between the front support bearings 26, 28 of the helix pair 14 seen in FIG. 1.

A small bi-directional geared electric motor 82 is connected by a belt or chain 84 to drive a spring pressure adjustment screw 86. The pulley/chainwheel 94 has a non-round bore (e.g., square) 96 to match the extension of the screw 86. The screw 86 increases/decreases the space available for the spring 88 thus increasing/decreasing the force required to move the bearing 26 nearer to/further from the fixed bearing 28.

A retention pin 90 in a slot 92 restricts movement of the bearing 26 within a desired range.

The scope of the described invention is intended to include all embodiments coming within the meaning of the following claims. The foregoing examples illustrate useful forms of the invention, but are not to be considered as limiting its scope, as those skilled in the art will be aware that additional variants and modifications of the invention can readily be formulated without departing from the meaning of the following claims.

I claim:

1. A harvester attachment for row-planted ground crops, said harvester attachment comprising
    a framework supporting a plurality of revolvably driven helix pairs, each helix having a front support bearing disposed in a predefined distance above ground level, said helix pairs extending at a slope upwards and rearwards, in a direction opposite to the direction of travel of said harvester; and
    a mechanism supported by said framework, arranged to adjust the force and distance between the axes of said front support bearings of said helix pairs.

2. A improved harvester attachment as claimed in claim 1, wherein said mechanism is arranged to adjust the distance between the axes of said front support bearings by up to about 10-30 mm.

3. A harvester attachment as claimed in claim 1, wherein said mechanism is powered pneumatically.

4. A harvester attachment as claimed in claim 1, wherein said mechanism is powered hydraulically.

5. A harvester attachments as claimed in claim 1, wherein said mechanism is powered electrically.

6. A harvester attachment as claimed in claim 1 wherein said adjustment being effected automatically.

7. A harvester attachment as claimed in claim 1 wherein said adjustment is being effected through a control element operated as required by a human attendant.

* * * * *